US006435805B1

(12) United States Patent
Smith

(10) Patent No.: US 6,435,805 B1
(45) Date of Patent: *Aug. 20, 2002

(54) TIRE MANIPULATOR FOR MINE SERVICE VEHICLES

(76) Inventor: Barry Smith, P.O. Box 2327, Orillia, Ontario (CA), L3V 6V7

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/574,238

(22) Filed: May 19, 2000

(51) Int. Cl.[7] .............................. B60C 3/00; B60C 25/00
(52) U.S. Cl. ........................ 414/543; 414/545; 212/349; 212/231; 157/1.11
(58) Field of Search .................................. 212/230, 253, 212/254, 347, 348, 349; 414/543, 545; 157/1.11; D12/14; 254/2 R

(56) References Cited

U.S. PATENT DOCUMENTS

| | | | | |
|---|---|---|---|---|
| 3,927,778 A | * | 12/1975 | Zrostlik ...................... 214/333 |
| 4,314,597 A | * | 2/1982 | Zrostlik ...................... 157/1.11 |
| 4,396,126 A | * | 8/1983 | Moravec et al. ............ 212/230 |
| 4,419,038 A | * | 12/1983 | Pendergraft .................. 414/543 |
| 4,511,048 A | * | 4/1985 | Volakakis et al. ........... 212/253 |
| 4,515,282 A | * | 5/1985 | Falch ......................... 212/254 |
| 5,720,527 A | * | 2/1998 | Sartaine et al. ............... 299/64 |
| 5,731,987 A | * | 3/1998 | Strong et al. ............... 364/505 |

OTHER PUBLICATIONS

IMT TireHandler brochure.

* cited by examiner

Primary Examiner—Eileen D. Lillis
Assistant Examiner—Charles Fox
(74) Attorney, Agent, or Firm—Ridout & Maybee LLP

(57) ABSTRACT

A tire manipulator for mine service vehicles has a mast for mounting on a vehicle, a telescopic boom connected to said mast and wheel handling equipment connected to said telescopic boom. A first boom may connect said mast to a moveable boom, the moveable boom being connected to said telescopic boom.

10 Claims, 14 Drawing Sheets

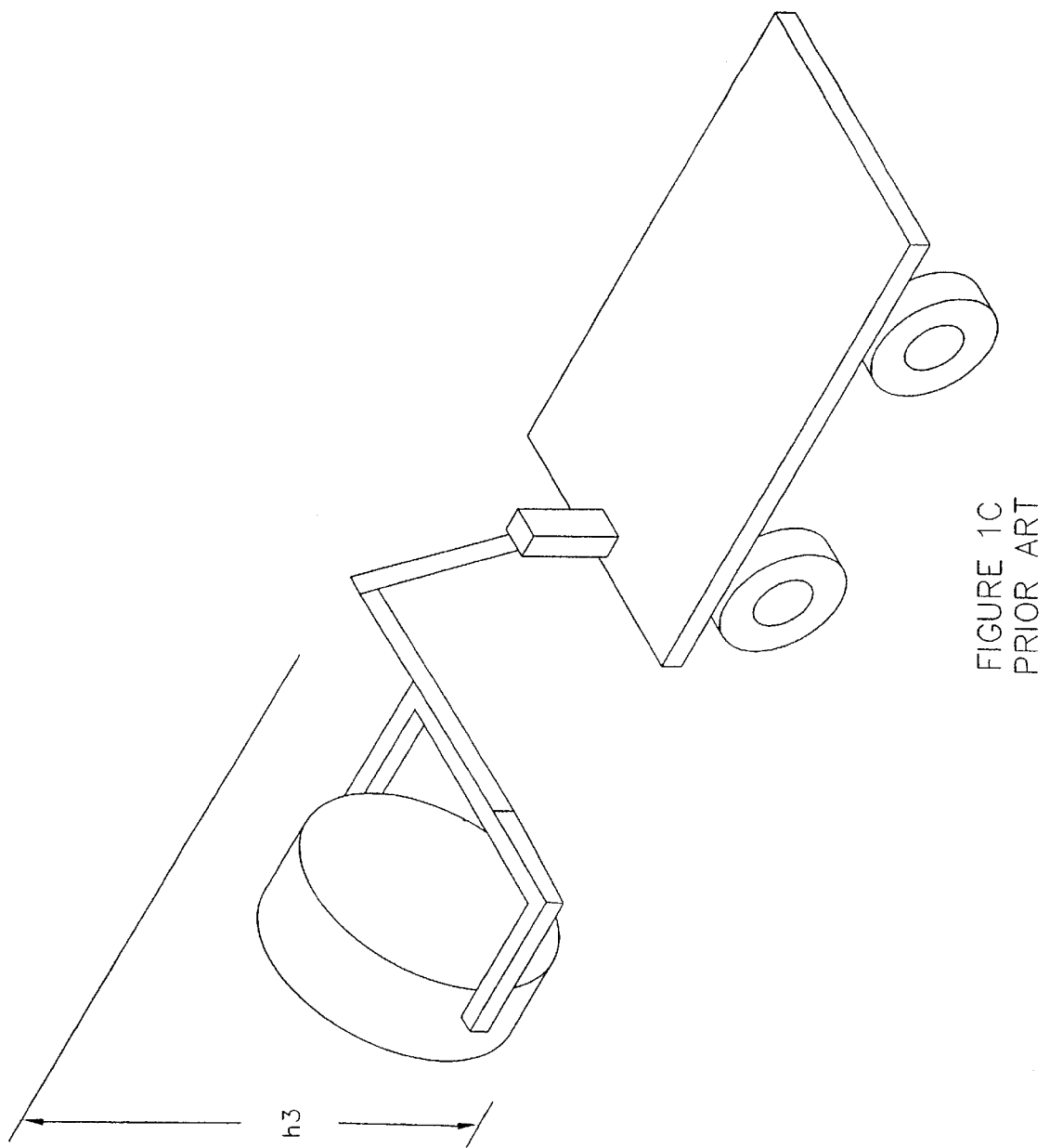

TIRE MANIPULATOR FOR MINE SERVICE VEHICLES

CROSS REFERENCE TO RELATED APPLICATION

This application claims priority from Canadian patent application number 2,272,559, filed May 21, 1999, which is pending.

FIELD OF THE INVENTION

This invention relates to an apparatus for manipulating and carrying very large articles in confined spaces. More particularly, the invention relates to a vehicle adapted to transport and manipulate the massive tires used on mining equipment in the confined space of underground mines.

BACKGROUND OF INVENTION

The concept of manipulating a large article in confined space is, of course, dependent upon the size of the space and the size of the article. It could include a small model handling articles which are small in real terms but large in comparison to the space available. Thus, while the invention is intended for operation in large scale mining operations, it may equally be used in model operations if desired. Such model operations may be useful in operator training.

Tires used on underground equipment may be gigantic. For example, a single tire may weigh well over 3000 lbs. and as much as 20,000 lbs. and may have a diameter of well over 10 feet. The cost of such tires may be in the region of $5,000.00–$15,000.00.

Frequently, the dimensions of a mine tunnel which accommodates mining equipment using such tires may be 16 feet in width and 16 feet in height. In most cases the height is much less than 16 feet since various impedimenta, e.g. air ducts etc., are often suspended from the ceiling. Such impedimenta may not impede the operation of the mining equipment with the tires installed at the ends of horizontal axles extending laterally across the tunnel but may present serious problems if a tire must be changed.

For the above reasons, if a tire fails during use in the mine, it has been common practice to drive the respective vehicle where repairs are convenient. This could be several hours away. When the vehicle arrives at such a place the tire is often damaged beyond repair at great financial loss.

In surface mine applications massive tires for use with massive vehicles have frequently been handled by heavy carrier service vehicles having an articulated boom operated from the top of a support tower, called a mast, for lifting and carrying the tire. The mast must be tall enough for the boom to clear upward projections from the service vehicle, e.g. the cab. It is not possible to use such vehicles in an underground mine environment since its physical size and the size and operation of the of the articulated boom would provide projecting elbows beyond the limits of the mine tunnel.

Such a vehicle equipped with gripper arms projecting in front of it to carry the tire is the TireHand (trademark) manufactured by Iowa Mold Tooling (IMT). Such a machine is useful in an underground environment but the overall size of the truck carrier and the combined height of the mast and the highest peak of the angled articulated boom would cause problems. It must be limited by the ceiling impedimenta in an underground mine tunnel to probably around 12 feet for stationary equipment and around 9 feet for moving equipment. Manipulation of a tire on a wheel of massive mining machinery inevitably causes high peaking of an articulated boom above the top of the mast.

It would be desirable to provide handling apparatus which will not only operate to carry a replacement tire to a disabled vehicle in a mine tunnel but will also locate it in a position for easy replacement. Still further, it would be desirable that such apparatus may be provided with equipment to actually change the tire.

The present inventors have addressed these problems.

SUMMARY OF INVENTION

Accordingly the invention provides a vehicle to transport and manipulate large articles in confined spaces. The vehicle has article manipulating equipment mounted on a boom thereof, the large article handling equipment comprising a mast, a first short boom and a second boom having a telescopic inner boom. The inner boom being slidable telescopically into and out of the second moveable boom section. The second moveable boom being tiltably supported at the end of the boom section. The boom section is tiltably supported at the end of the mast which is rotatable about a vertical axis with respect to the vehicle, a distal end of the inner boom section supporting gripping equipment for said large article, said unit being adjustably positionable on said inner is boom section.

The mast may be rotatable about a vertical axis and a moveable boom section may be hinged to an upper end of the mast through a horizontal axis. The second moveable boom carries the telescopic inner boom to be moveable into and out of a distal end of the second boom.

The mast is rotatable through a continuous 360° rotation. It may be generally vertical and may have a height for travelling of less than 8 feet.

The length of the mast should be sufficient to allow manipulation of the article but not so great as to foul the ceiling of an underground mine tunnel. Thus, if impedimenta on the ceiling of the tunnel effectively limits tunnel height to around 12 feet, then the combined height of the vehicle and the mast with the boom sections extended to allow for picking up of a tire off the deck would be a maximum of not more than 12 feet.

BRIEF DESCRIPTION OF DRAWINGS

An embodiment of the invention will now be described with reference to the drawings in which:

FIGS. 1, 1A, 1B and 1C show an articulated boom as conventionally used showing how, at a particular stage in manipulation of a tire, the articulated boom peaks at high level;

DETAILED DESCRIPTION OF AN EMBODIMENT OF THE INVENTION

When a large mining vehicle is disabled to due to a damaged tire, a major problem exists. A standard service truck complete with an articulated crane and a manipulator is physically too large to manoeuvre in the underground mine tunnels. Therefore the mining vehicle must be brought to a suitable location for the standard service truck to perform the tire change. Generally, this location is on surface. It can be seen, therefore, there is a major problem in the use of a standard service truck complete with an articulated crane and manipulator.

Figure 1:
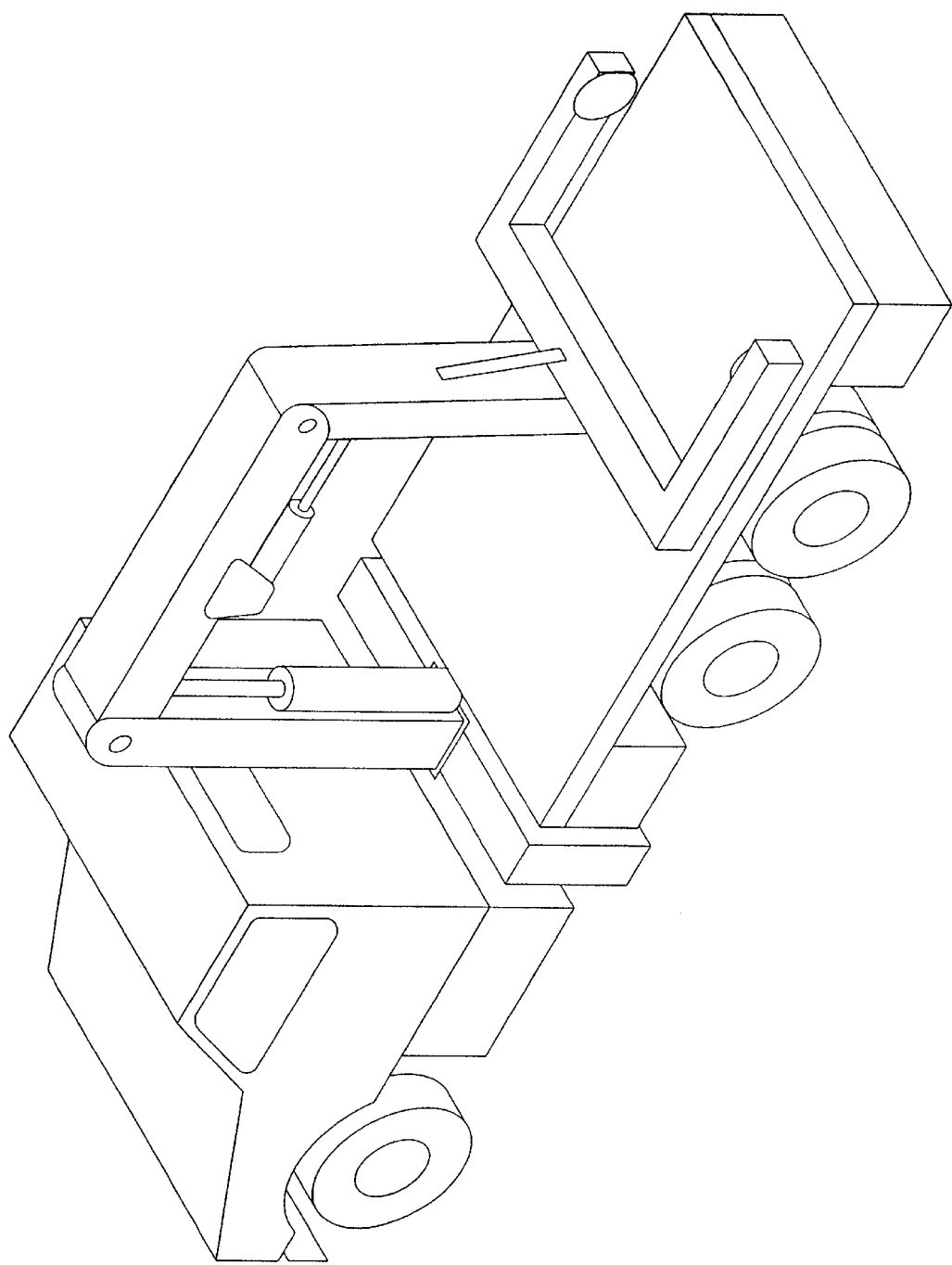

It is then necessary to position tire carrying equipment to accept the wheel from the disabled vehicle from the side with the wheel in vertical position. Heavy impact equipment is used to release the wheel from the vehicle and, conventionally, the tire lifting equipment may be placed in position as shown in FIG. 1 by means of an articulated boom. In open cast mining equipment as shown in FIGS. 1, 1A, 1B and 1C may be used since the size of the truck and peak of the boom are not confined and there is no particular difficulty in positioning the equipment to manipulate the tire.

Figure 1A:
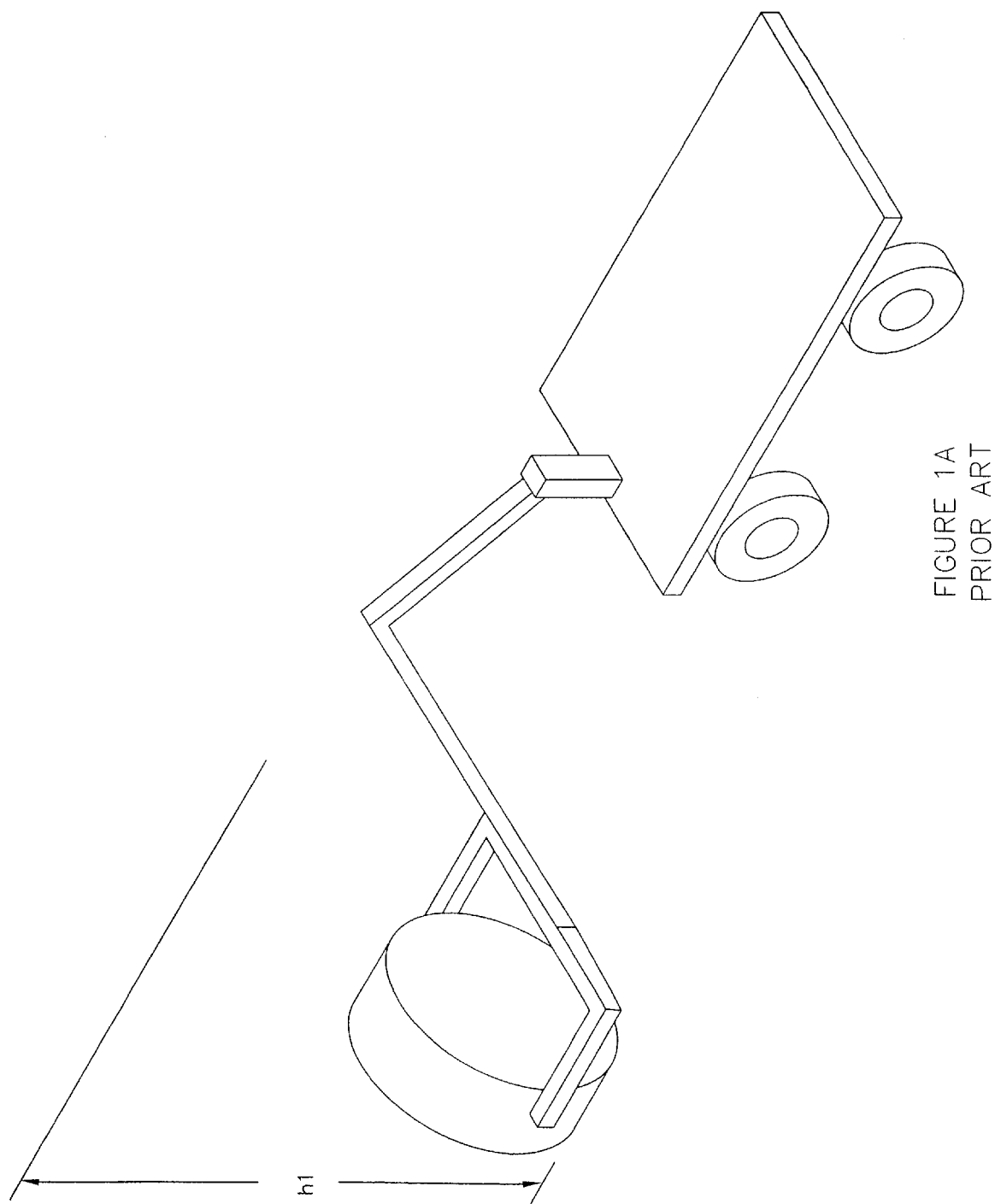
Figure 1B:
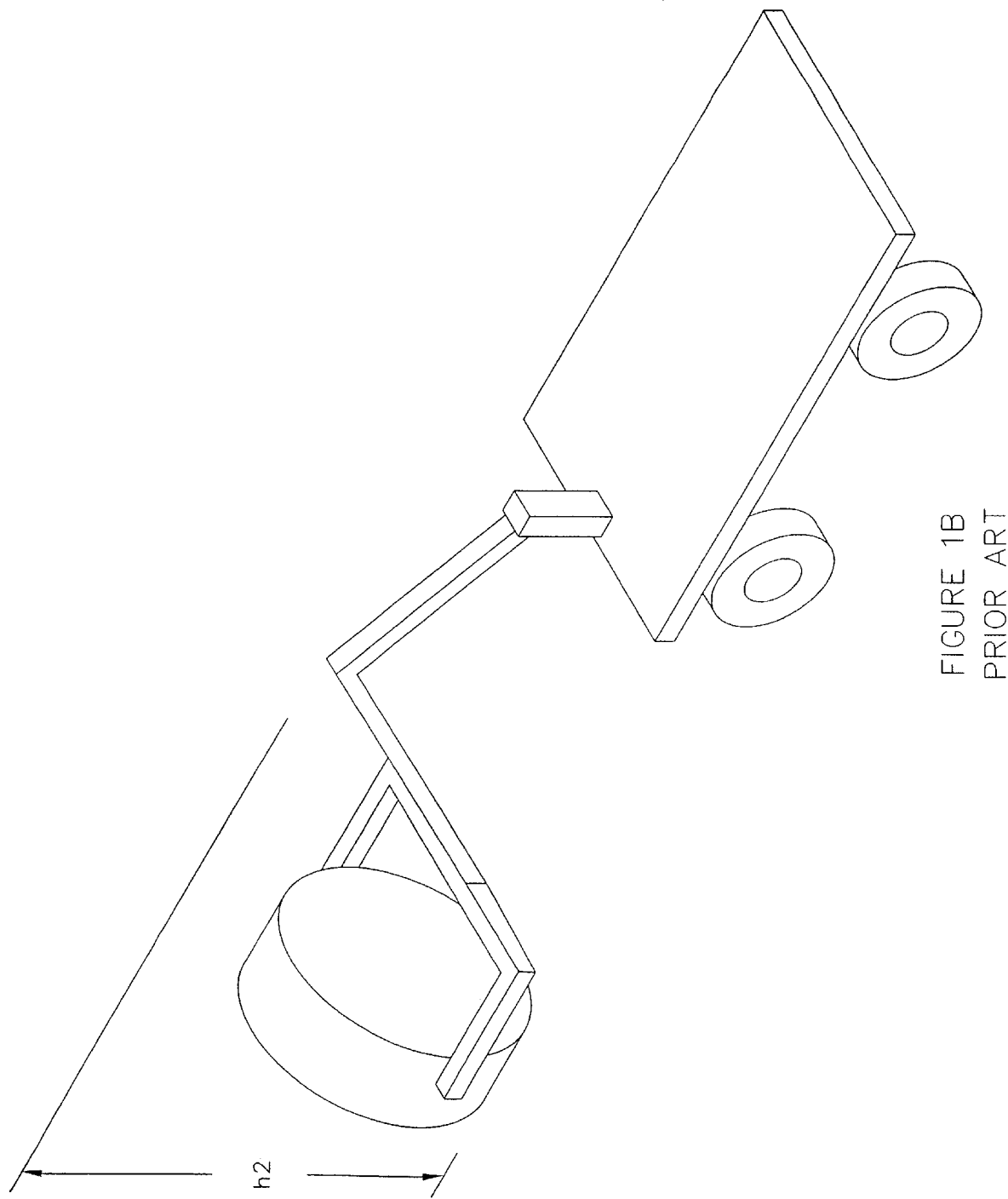

The articulated boom 16 is mounted on support tower 22 which is rotatable about a vertical axis and comprises limb 24 articulated to limb 26. The end limb 26 carries the actual equipment to grip the wheel. In order to bring the wheel gripping equipment into position to accept the wheel, a skilled operator may extend the limbs 24, 26, and alter the angles between them as he rotates the support limb 22 to bring the equipment into position, first to grip the wheel before it is released from the disabled vehicle (FIG. 1A); second to lift it (FIG. 1B); and third to move it into position parallel to the front or back of the service vehicle laterally across the tunnel (FIG. 1C). The position shown in FIG. 1A is the lowest (see height $h_1$ in FIG. 1A). Raising the wheel to the position shown in FIG. 1B necessitates a high peak between limbs 24 and 26 (see height $h_2$ in FIG. 1B) as the angle between them narrows to lift the wheel. In view of the size of the wheels such high peak 28 is likely to interfere with impedimenta carried along the roof of the tunnel. The peak of the articulated boom when the wheel is in transport position (FIG. 1C) is even higher (see height $h_3$ in FIG. 1C).

None of this is of importance for open cast mining but for underground work it can be seen that, even if it were possible to get the truck into the tunnel, the space required for manipulating the articulated boom is too great for the tunnel.

Figure 2:
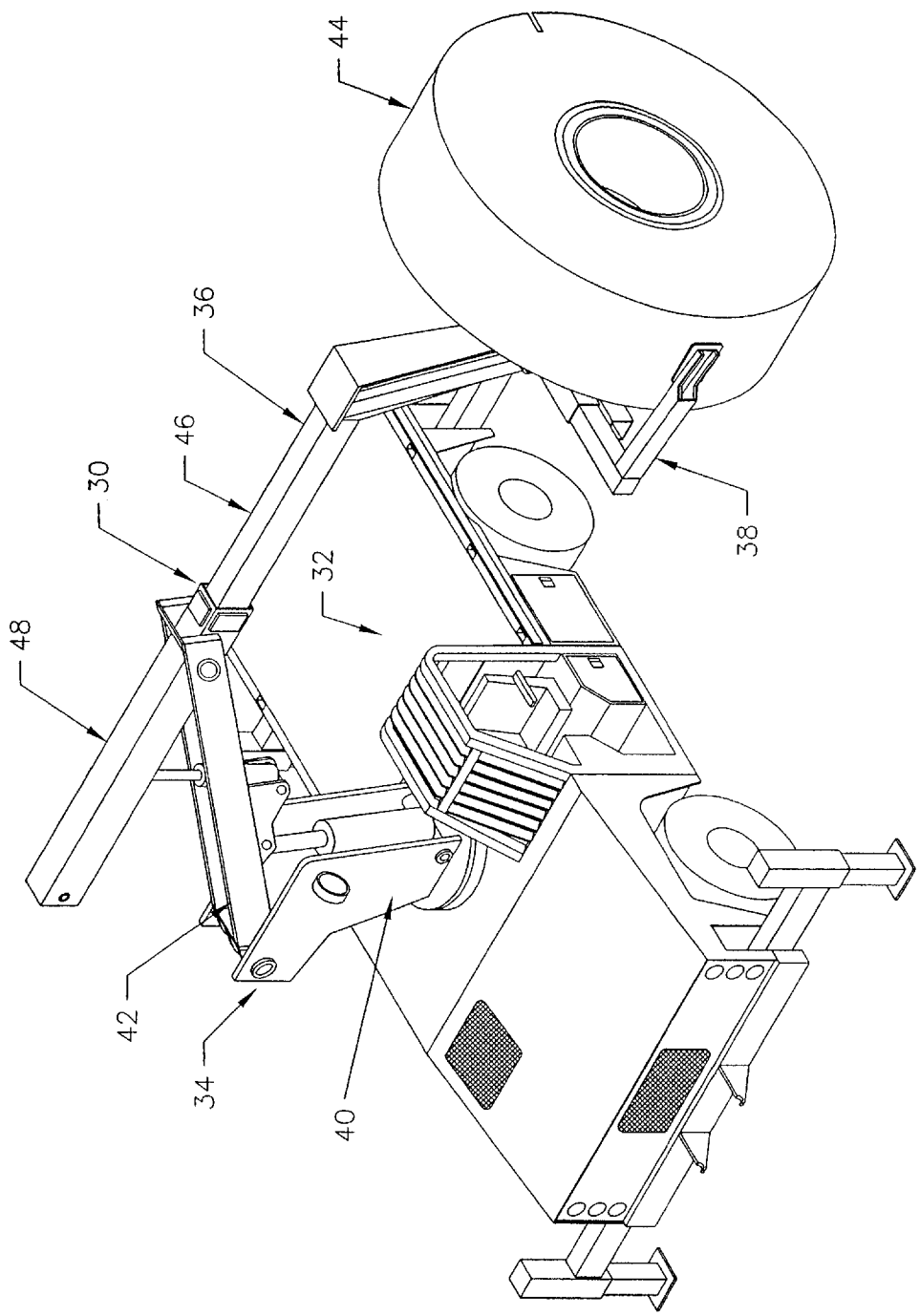
FIG. 2 shows an embodiment of the vehicle according to the invention having large article manipulating apparatus with a telescopic boom.

FIG. 2 shows an embodiment of a vehicle according to the invention. Vehicle 30 comprises a deck 32 and a mast 34 carrying a boom 42, a moveable boom 48, and a telescopic inner boom 36 which, itself, carries wheel handling gripping equipment 38.

The mast 34 is rotatable about a vertical axis over a continuous 360° rotation so that the wheel gripping equipment may be directed in any direction.

The mast 34 also comprises a three part structure including a boom 42, a moveable boom 48, and a telescopic inner boom 36. Boom 42 is hinged to mast 34 and carries the moveable boom 48 and telescopic inner boom 36 at its distal end. The dimensions of booms 42, 48 and 36 and mast 34 are of importance. Generally speaking, the height of mast 34 must be less than half the height of the mast used with articulated booms. Thus for heavy mining equipment, the overall dimensions of the vehicle 30 should be such that total height of deck 32 and mast 34 with booms 42, 48 and 36 at its maximum height extension is around 12 feet.

Other details of the service vehicle include the provision of a driver's cab and stabilizing legs extendable from the vehicle to allow it to support the heavy articles on a boom extending therefrom without tipping. The vehicle's diesel engine propels the full hydraulic drive and four-wheel steering. A hydraulic on board air compressor allow the operator to remove the wheel nuts.

Moveable boom 48 is tiltable on the distal end of boom 42 of mast 34. Moveable boom 48 comprises an inner telescopic member 36 which may be extended out and retracted into it to position the gripping equipment for the wheel where desired. Thus, the moveable boom 48 and the inner telescopic boom 36 are hinged at the end of boom 42 which is hinged to the mast 34.

In operation, the vehicle is dispatched from the surface of the mine with a new wheel assembly 44 which is being carried on deck 32. The service vehicle approaches the disabled vehicle as closely as possible. The mast 34 is rotated on its vertical axis to direct the boom 42, moveable boom 48, inner telescopic boom 36 and the wheel gripping equipment generally. Inner telescopic boom 36 is extended and moveable boom 48 with inner telescopic boom 36 is tilted until the gripping equipment 38 can be positioned to grip wheel 44 as shown roughly in FIG. 3.

The damaged wheel 44 is removed from the disabled vehicle using heavy impact equipment conveniently carried by the service vehicle 30.

Figure 4:
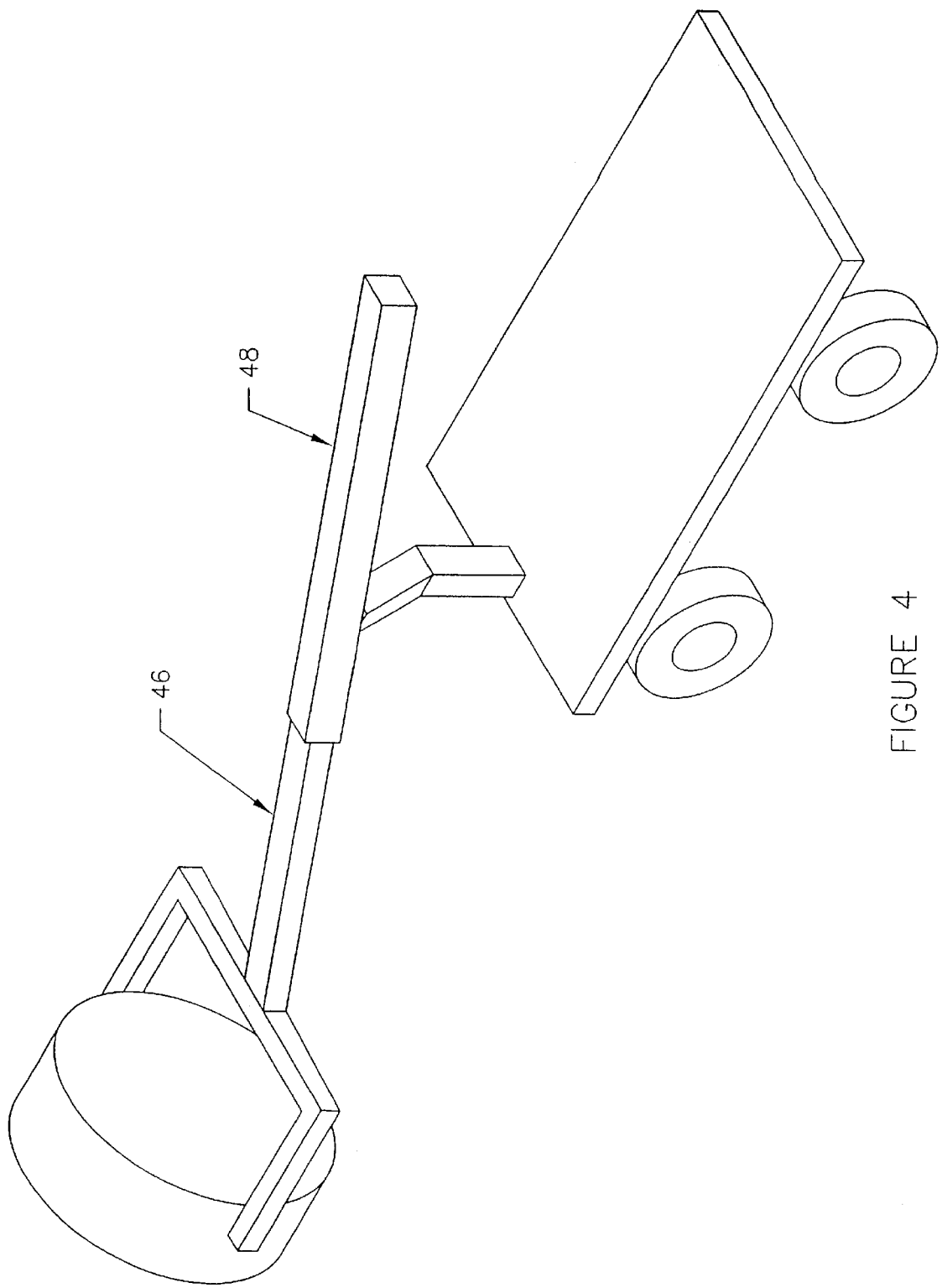

The inner telescopic boom 36 is then retracted to remove the wheel 44 from the disabled vehicle as shown in FIG. 4. Some further manipulation of all booms may be necessary to compensate for any lateral change in position due to retracting of inner telescopic boom 36. All boom functions for raising, lowering and rotating are conventionally hydraulically controlled especially in view of the very large weights involved.

Figure 5:
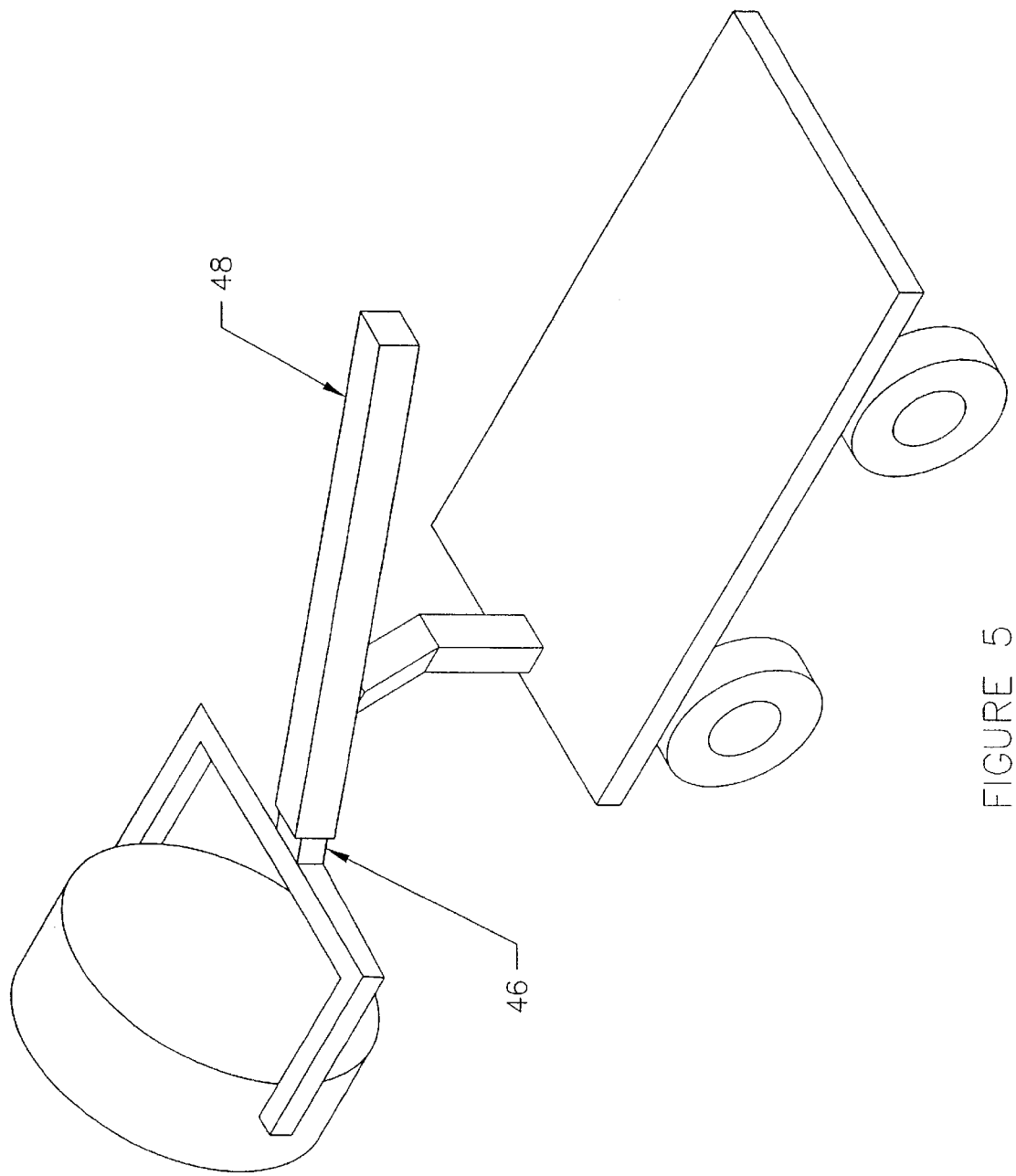
Figure 6A:
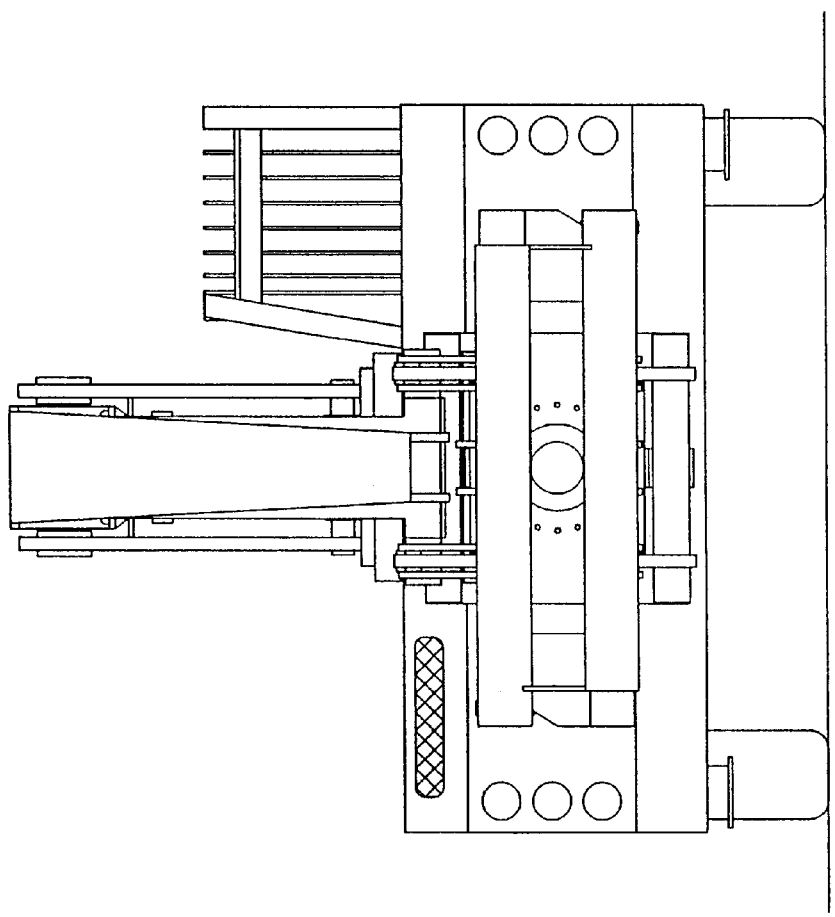
FIGS. 6A, 6B, 6C and 6D are engineering drawings showing one specific embodiment of the invention.
Figure 6B:
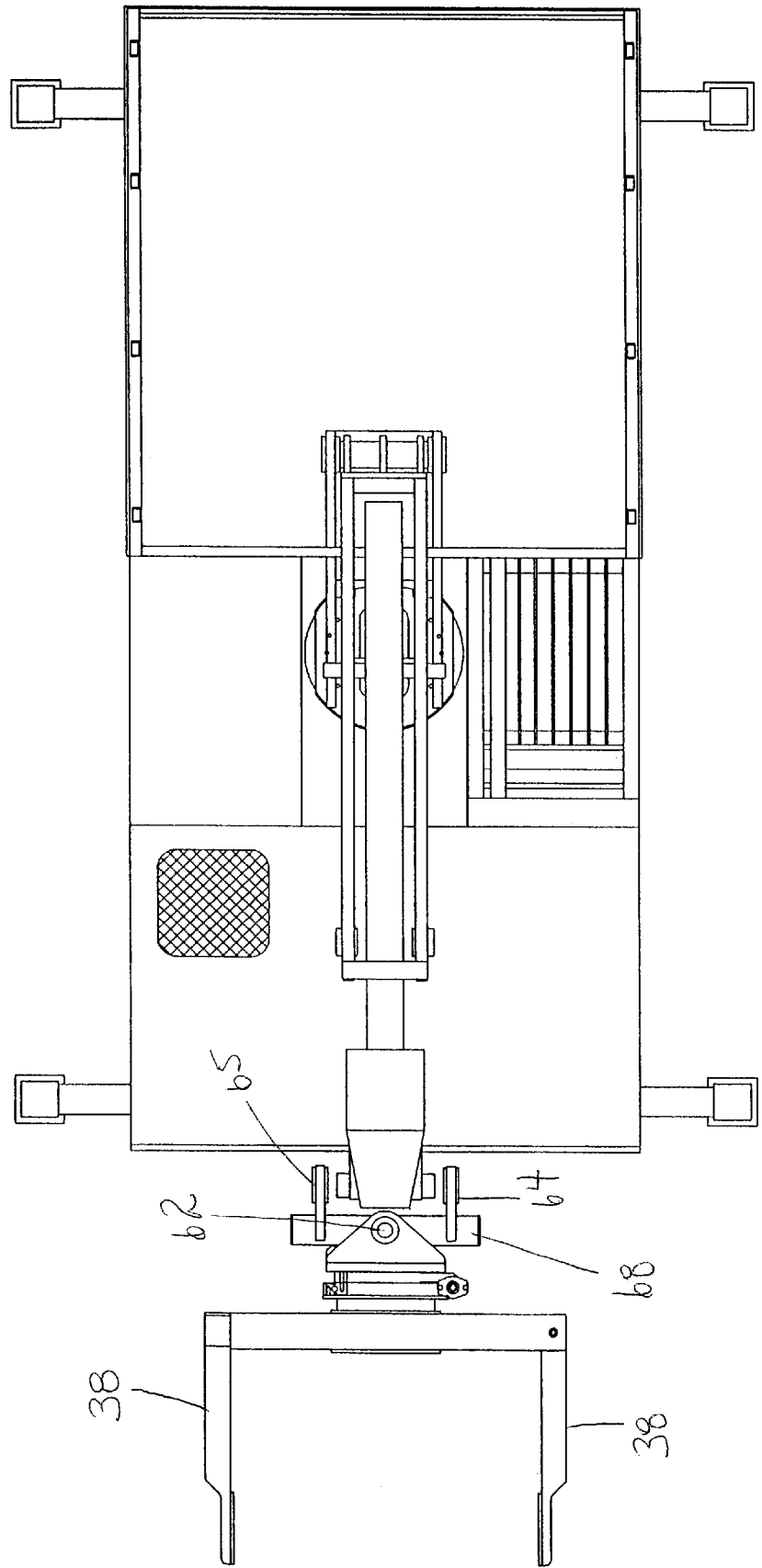
Figure 6C:
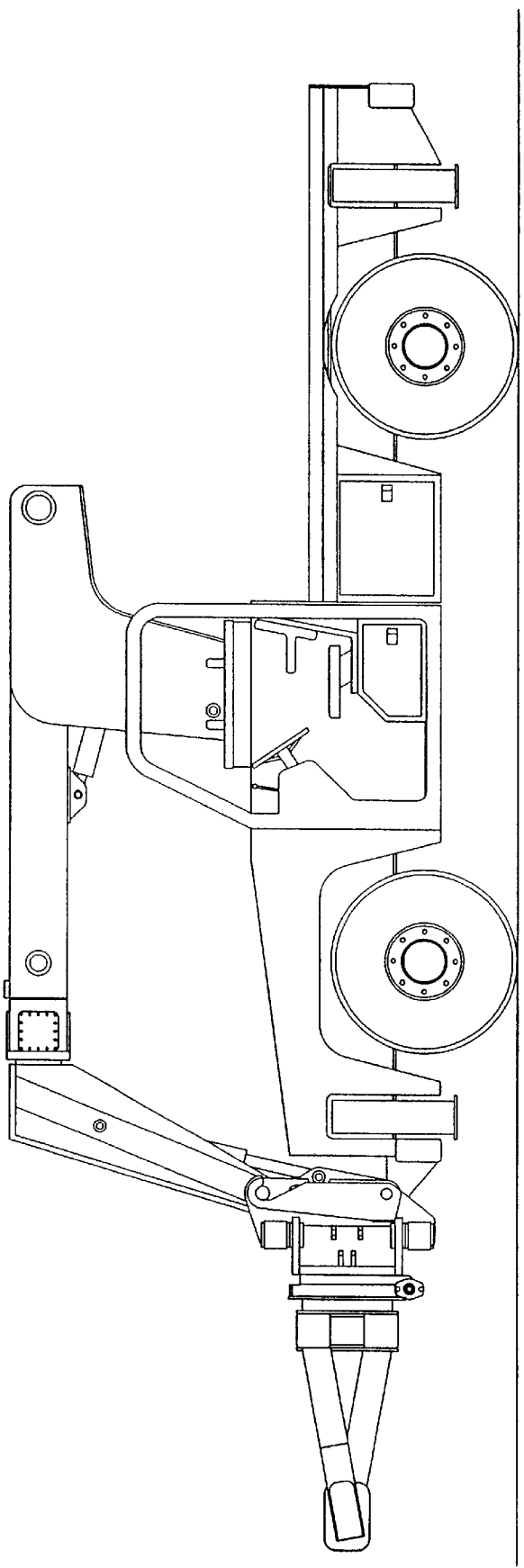
Figure 6D:
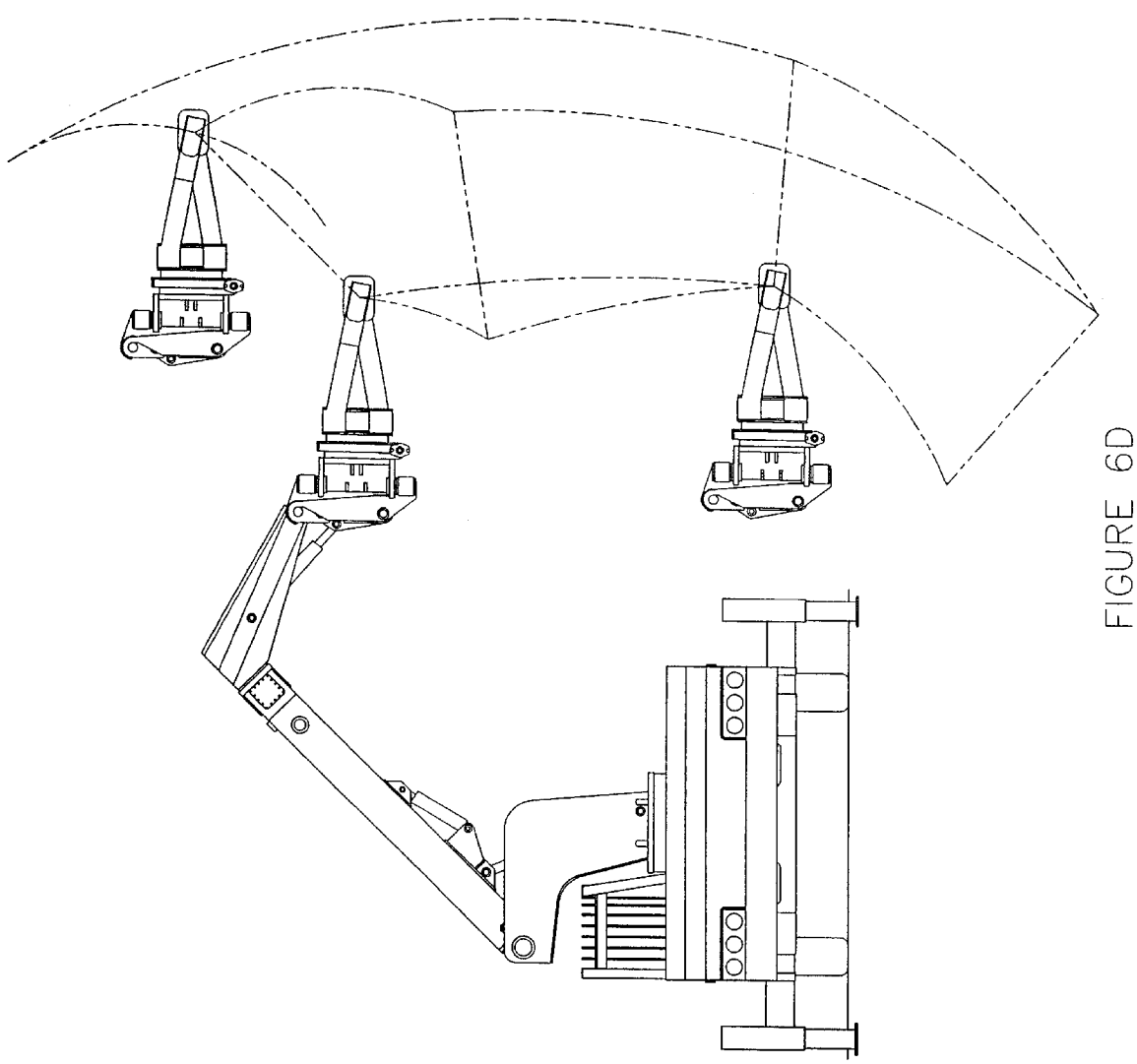

Once wheel 44 is released from the disabled vehicle and laterally displaced therefrom and raised from the ground, it is possible to move it away from the disabled vehicle in the direction of the tunnel until it comes alongside service vehicle 30. Booms 42, 48 and 36 may be retracted to minimize tipping effect of wheel 44 if there is sufficient space, mast 34 may be rotated to move wheel 44 into position behind the vehicle. This position is shown in FIG. 5. It may be seen that at no time during the operation does the distal end of boom 42 rise unduly.

The new wheel 44 is then retrieved from the deck and installed in the reverse sequence on the disabled vehicle. The service vehicle 30 may then remove the damaged wheel 44 from the tunnel and return it back the surface of the mine.

FIGS. 6A–6D show mechanical details of an embodiment of the invention.

Figure 3:
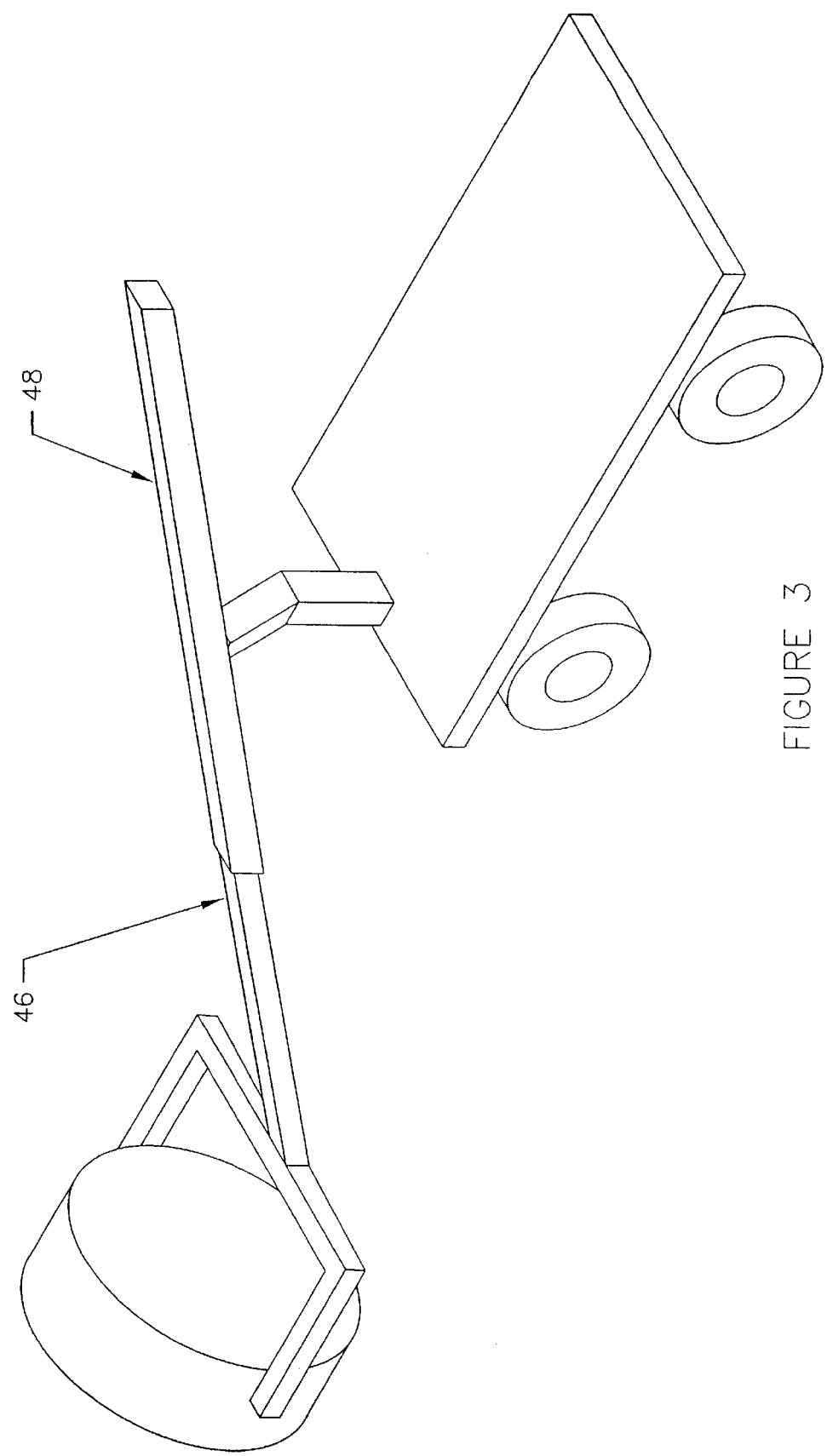
FIGS. 3, 4 and 5 show operation of the equipment illustrated in FIG. 4.
Figure 7A:
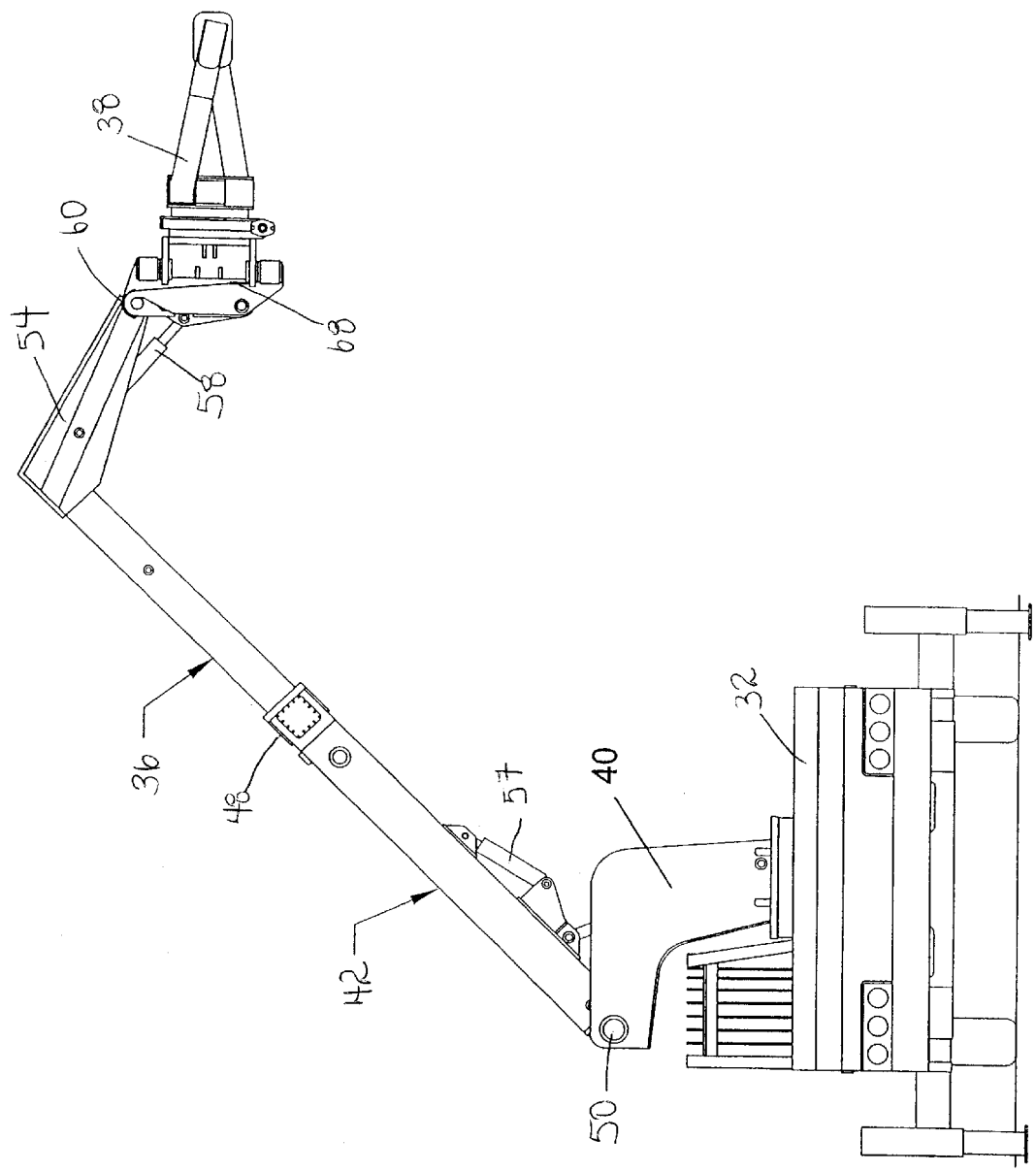
FIGS. 7A and 7B show aspects of the operation of sketches 3, 4 and 5 in better mechanical detail.
Figure 7B:
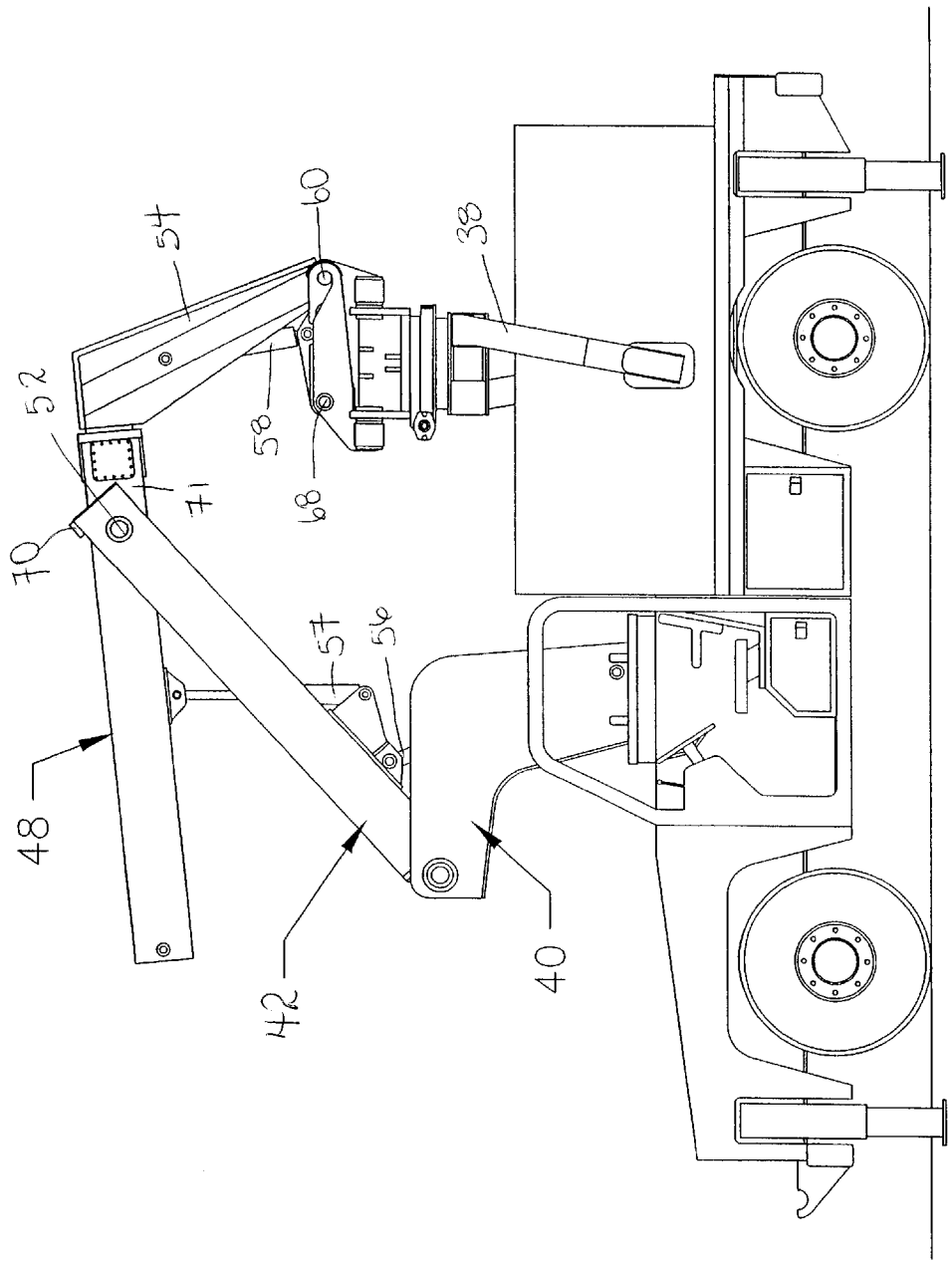

FIGS. 7A and 7B show mechanical details of how the operation of FIGS. 3–5 is achieved. FIG. 7A in particular shows that, although the apparatus is designed for operation in confined space, height can be achieved if desired.

I claim:

1. A tire manipulator for mine service vehicles comprising a mast for mounting on a vehicle, a first boom pivotally connected to said mast, a moveable boom pivotally connected to said first boom at the distal end of the moveable boom, a telescopic boom connected to said moveable boom, a gripper boom connected to said telescopic boom, and wheel handling equipment connected to said gripper boom.

2. A tire manipulator as claimed in claim 1, wherein said wheel handling equipment comprises gripper arms.

3. A tire manipulator as claimed in claim 1, wherein said tire manipulator is mounted on a vehicle.

4. A tire manipulator as claimed in claim 1, wherein said telescopic boom is extendable into and out of said moveable boom.

5. A tire manipulator as claimed in claim 1, wherein said mast is rotatable.

6. A tire manipulator as claimed in claim 5, wherein said mast is rotatable through a continous 360° rotation.

7. A tire manipulator as claimed in claim 1, wherein said gripper boom is connected to said telescopic boom at an angle which is less than 180°.

8. A tire manipulator as claimed in claim 1, wherein said wheel handling equipment is vertically pivotal in relation to said gripper boom.

9. A tire manipulator as claimed in claim 8, wherein said wheel handling equipment is horizontally pivotal horizontal pivotally in relation to said gripper boom.

10. A tire manipulator as claimed in claim 1, wherein said first boom and said moveable boom are pivotally connected proximal to the distal end of said first boom.

* * * * *